United States Patent [19]
Karaki et al.

[11] Patent Number: 5,612,715
[45] Date of Patent: Mar. 18, 1997

[54] SYSTEM AND METHOD FOR DYNAMICALLY ADJUSTING DISPLAY RESOLUTION OF COMPUTER GENERATED DISPLAYS

[75] Inventors: Nobuo Karaki; Jinichi Nakamura, both of Suwa, Japan

[73] Assignee: Seiko Epson Corporation, Tokyo, Japan

[21] Appl. No.: 426,459

[22] Filed: Apr. 18, 1995

Related U.S. Application Data

[63] Continuation of Ser. No. 226,429, Apr. 12, 1994, abandoned, which is a continuation of Ser. No. 906,991, Jun. 30, 1992, abandoned.

[30] Foreign Application Priority Data

| Jul. 1, 1991 | [JP] | Japan | 3-188150 |
| May 6, 1992 | [JP] | Japan | 4-140914 |

[51] Int. Cl.⁶ .................................................. G09G 3/00
[52] U.S. Cl. ............................................. 345/132; 395/128
[58] Field of Search .................................. 345/132, 119, 345/120, 115; 348/565, 564; 359/128, 132

[56] References Cited

U.S. PATENT DOCUMENTS

| 4,672,683 | 6/1987 | Matsueda | 345/115 |
| 4,931,956 | 6/1990 | Stapleton | 345/185 |
| 5,029,112 | 7/1991 | Sakamoto et al. | 345/115 |
| 5,051,929 | 9/1991 | Tutt et al. | 345/565 |
| 5,065,346 | 11/1991 | Kawai et al. | 358/183 |
| 5,119,081 | 6/1992 | Ikehira | 345/132 |
| 5,142,616 | 8/1992 | Kellas et al. | 345/115 |
| 5,179,639 | 1/1993 | Taaffe | 395/128 |
| 5,196,738 | 3/1993 | Takahara et al. | 345/100 |
| 5,233,423 | 8/1993 | Jernigan et al. | 348/565 |
| 5,237,653 | 8/1993 | Noguchi et al. | 345/120 |
| 5,334,994 | 8/1994 | Takagi | 345/120 |
| 5,402,148 | 3/1995 | Post et al. | 345/132 |
| 5,420,605 | 5/1995 | Vouri et al. | 345/132 |
| 5,481,275 | 1/1996 | Mical et al. | 345/132 |
| 5,517,209 | 5/1996 | Holland et al. | 345/132 |
| 5,528,740 | 6/1996 | Hill et al. | 395/128 |
| 5,532,716 | 7/1996 | Sano | 345/132 |

FOREIGN PATENT DOCUMENTS

| 1231580 | 9/1989 | Japan . |
| 231580 | 9/1989 | Japan . |
| 165323 | 6/1990 | Japan . |

OTHER PUBLICATIONS

Nikkei Computer Graphics, 1992, 2, pp. 127–132, "New High-Resolution Boards for PC-98, The Equivalent of IBM XGA Were Successively Introduced".

*Primary Examiner*—Richard Hjerpe
*Assistant Examiner*—Amare Mengistu
*Attorney, Agent, or Firm*—Oblon, Spivak, McClelland, Maier & Neustadt, P.C.

[57] ABSTRACT

A computer system that supports an advanced operating system and advanced application programs that create high resolution images for display and further supports old operating system and application software that run as subordinate processes to the advanced operating system of the computer and which create low resolution images for display, wherein images from both the advanced and old software are displayed, at high resolution, simultaneously on the computer system's display device, typically in separate windows, has a high resolution graphics control pathway and a low resolution graphics control pathway, both for displaying images over the entire viewable area of a display device. In this way, when one of the images seen in a high resolution window is an image generated by software that only produces enough data to drive a low resolution display, that image can be redisplayed at the resolution that it was originally intended to be displayed at, in order to see that image more clearly.

27 Claims, 14 Drawing Sheets

NORMAL MODE

HIGH RESOLUTION MODE

| COMMAND | VALUE | PARAMETER VALUE |
|---|---|---|
| RESET | 00 | |
| MASTER | 6f | |
| SYNC | 0e | 18,26,a2,14,02,48,77,6d |
| PITCH | 47 | 50 |
| ZOOM | 46 | 00 |
| CSRFORM | 4b | 0e,01,6e |
| SCROLL | 70 | 00,00,00,99 |
| ⋮ | ⋮ | ⋮ |

FIG.-7A

| COMMAND | VALUE | PARAMETER VALUE |
|---|---|---|
| RESET | 00 | |
| MASTER | 6f | |
| SYNC | 0e | 18,4e,07,25,07,07,90,65 |
| PITCH | 47 | 50 |
| ZOOM | 46 | 00 |
| CSRFORM | 4b | 0e,00,7f |
| SCROLL | 70 | 00,00,00,19 |
| ⋮ | ⋮ | ⋮ |

FIG.-7B

| SYMBOL | TIMING | |
|---|---|---|
| | ODD FIELDS | EVEN FIELDS |
| H | 30.45 μS(32.84KHz) | |
| HDISP | 23.41 μS | |
| HFP | 2.34 μS | |
| HS | 1.76 μS | |
| HBP | 2.93 μS | |
| V | 12.5ms(410.5H,80Hz) | |
| VDISP | 11.42ms(375H) | |
| VFP | 0.244ms(8H) | 0.259ms(8.5H) |
| VS | 0.152ms(5H) | |
| VBP | 0.685ms(22.5H) | 0.670ms(22H) |

FIG.-8A

| SYMBOL | TIMING |
|---|---|
| H | 40.28 μS(24.83KHz) |
| HDISP | 30.4 μS |
| HFP | 3.04 μS |
| HS | 3.04 μS |
| HBS | 3.8 μS |
| V | 17.72ms(440H,56.4Hz) |
| VDISP | 16.11ms(400H) |
| VFP | 0.28ms(7H) |
| VS | 0.32ms(8H) |
| VBS | 1.01ms(25H) |

FIG.-8B

SYSTEM AND METHOD FOR DYNAMICALLY ADJUSTING DISPLAY RESOLUTION OF COMPUTER GENERATED DISPLAYS

This application is a continuation of application Ser. No. 08/226,429, filed on Apr. 12, 1994, now abandoned, which is a continuation of Ser. No. 07/906,991, filed on Jun. 30, 1992, now abandoned.

BACKGROUND OF THE INVENTION

1. Field of the Invention

This invention relates generally to computers, and more specifically to computers that display multiple windows at differing resolutions.

2. Related Art

Conventionally, computers are equipped with CRT-type monitors of a predetermined resolution (e.g., 1120×750 dots) and performed display by means of a CRT controller and a video memory having a capacity corresponding to this resolution.

Some computers execute a single application under the control of a single operating system, while other computers execute multiple applications under a single operating system. Further, configurations are possible in which one of the multiple application programs is executed under the control of a minor operating system being executed as a subordinate process of the main operating system. Therefore, there is a need to be able to display a window of one program at a resolution that matches the resolution of the CRT, i.e., 1120×750 dots, and to display a window of another program at a resolution different born that resolution (e.g., 640×400 dots).

The former is referred to as "high-resolution mode" screen display, and the latter is referred to as "normal mode" screen display. Conventional computer display systems that satisfy this need for both screen displays are configured such that the CRT is a multi-scan device that switches the deflection frequency, and the initial power-up condition is determined by a high resolution/normal selection switch provided on the computer.

However, when a window is displayed by an application program with a resolution different from that of the screen being displayed by another application, conventional computer display systems require much time and trouble in switching. This is because when switching, the series of actions of terminating the first application program, turning the power to the computer display system off, switching the selection switch, turning on the power to the computer display system and executing the next application program must be performed in sequence.

There are conventional computer systems with displays in which a number of windows are open on the screen and processing by each of the application programs is assigned to each window. When one of the open windows is selected, the selected window is displayed on the very top layer and the process assigned to that window is active.

Further, when multiple windows are open on some of these computers, the size of the selected window can be increased to enlarge the display area by means of a mouse or other pointing device or the combination of prescribed keys referred to as hot keys.

However, when the maximum resolution that can be handled by the program controlling the window is smaller than the resolution of the full size of the screen in computers with this window system, the display area of the window is only part of the screen even when the window is at its maximum size and the window cannot be displayed over the entire screen. In the case of an application program having maximum resolution of 640×400 dots, that application can only be opened in a window that occupies part of the screen (approximately one third of display area) when run on a computer with a screen having a resolution of 1120×750 dots.

The present invention solves this problem, and facilitates the rapid switching of display of multiple screens with differing resolutions and in particular to facilitate the rapid switching of display between windows when those screens are displayed in windows.

SUMMARY OF THE INVENTION

Briefly, the present invention provides a system and method for facilitating the rapid switching of display of multiple screens of different resolutions, particularly between windows where the displayed windows contain images represented at different resolutions.

The first embodiment of the present invention is a computer and display system as shown in FIG. 1, which illustrates a computer system equipped with a display device having a prescribed resolution, a picture display control circuit that displays images on the display device wherein the display device is a multi-scan type video display in which at least the deflection frequency switches according to the horizontal frequency, and the picture display control circuit is equipped with a picture signal output means that outputs a picture signal of a first resolution or a picture signal of a second resolution. The first embodiment further includes a display switching designation means that designates switching between a first resolution picture signal and a second resolution picture signal, and a signal output control means that causes the picture signal output means to output the picture signal designated by the display switching designation means.

In the first embodiment, the display switching designation means may designate the switching of display by the operation of one or more keys on a keyboard.

The picture signal output means may be equipped with a picture memory that stores the picture data and a storage register where the resolution of the picture signal output to the display device is set; and the signal output control means M6 is equipped with a storage content switcher that switches the resolution of the picture signal set in the resolution storage register between the first resolution and the second resolution while also switching the picture data stored in the picture memory between picture data composed at the first resolution and picture data composed at the second resolution.

The second embodiment is equipped with, as shown in FIG. 2, a multi-scan type monitor in which the deflection frequency is a function of the horizontal sync frequency, a first picture display control circuit that displays images on the monitor and a second picture display control circuit that displays images, a display switching designation means that designates the switching of display between the two pictures (which have different resolutions), and a signal output switching means that outputs the designated picture signal from among the picture signals of the first and second picture display control circuits to the monitor.

In the first or second embodiments, the computer system of the present invention may be equipped with a window control means that opens a window of a prescribed size and assigns the process being executed to that window, and the entire screen including the window may be formed at a first resolution and the screen of the window may be formed at a second resolution.

The third embodiment illustrated in FIG. 3, includes a window control means that opens windows of a prescribed size and assigns a minor operating system executed as a subordinate process of the main operating system to one of those windows, and a first picture display control circuit that displays the entire screen including the opened window at a resolution of M×N on the display device, wherein the display device is a multi-scan type video display in which at least the deflection frequency switches according to the horizontal frequency, and a second picture display control circuit that performs picture display at a resolution of P×Q, which is a lower resolution than M×N and is the display resolution of the minor operating system, a display switching designation means that designates by operation of a prescribed key on a keyboard switching between the entire screen including the window and one window, and a signal output switching means that outputs the picture signal designated by the display switching designation means from among the picture signals of the first and second picture display control circuits.

In the second or third embodiments, it is desirable that the first and second picture display control circuits each be equipped with a picture memory where picture information is stored independently.

In the third embodiment, the display switching designation means may be equipped with a window designation means that designates one of the windows being displayed by the first picture display control circuit, and the first picture display control circuit may be equipped with a window display formation means that forms the entire display contents of the window designated by the window designation means in the picture memory, and a picture information output means that outputs the display contents that have been formed as a picture signal with resolution M×N to the multi-scan video display.

Also in the third embodiment, it is possible to execute at least the main operating system or the minor operating system in the background of the other operating system, and the computer may be equipped with a non-display picture updating means that updates, by means of background processing, the contents of the picture memory not being displayed when picture display is being performed by either the first or second picture display control circuit.

Action

In a first embodiment, following an indication from the display switching designation means to switch between video sources of different resolutions, the signal output control means outputs a video signal output from the picture signal output means to the display device.

Even if a picture signal with a different resolution should be output from the picture signal output means, the picture display will follow the change in resolution since the display device is a multi-scan type monitor that r adjusts its deflection frequency according to the horizontal sync frequency.

In the second embodiment, when the display switching designation means, designates switching between two pictures of having different resolutions, the picture signal designated by the display switching designation means is output to the monitor.

The second picture display control circuit performs picture display at a resolution different from the resolution of the first picture display control circuit, but even if a picture signal with a different resolution should be output from the signal output switching means, the picture display will follow the change in resolution since the display device is a multi-scan type monitor that switches its horizontal deflection frequency according to the input horizontal sync signal.

In the third embodiment, the resolution of the display device is M×N, and the window control means opens windows of a prescribed size and assigns the minor operating system being executed as a subordinate process of the main operating system to one of the windows. Here, images are switched as in the second embodiment when the display switching designation means designates the switching of display between the entire screen including the window and one of the windows. That is, when the picture signal from the first picture display control circuit is selected, picture display is performed at the resolution M×N, and when the picture signal from the second picture display control circuit is selected, picture display is performed at a resolution of P×Q (which is lower resolution than M×N).

Other objects, advantages and attainments together with a fuller understanding of the invention will become apparent and appreciated by referring to the following description and claims taken in conjunction with the accompanying drawings.

BRIEF DESCRIPTION OF THE DRAWINGS

FIGS. 7A and 7B are explanatory diagrams showing some of the registers in the CRTC and examples of parameters when normal mode is selected and when high resolution mode is selected.

FIGS. 8A and 8B are explanatory diagrams showing the display timing of display control circuit 29 in numerical values when normal mode is selected and when high resolution mode is selected.

DETAILED DESCRIPTION OF THE INVENTION

First Embodiment

Figure 4:
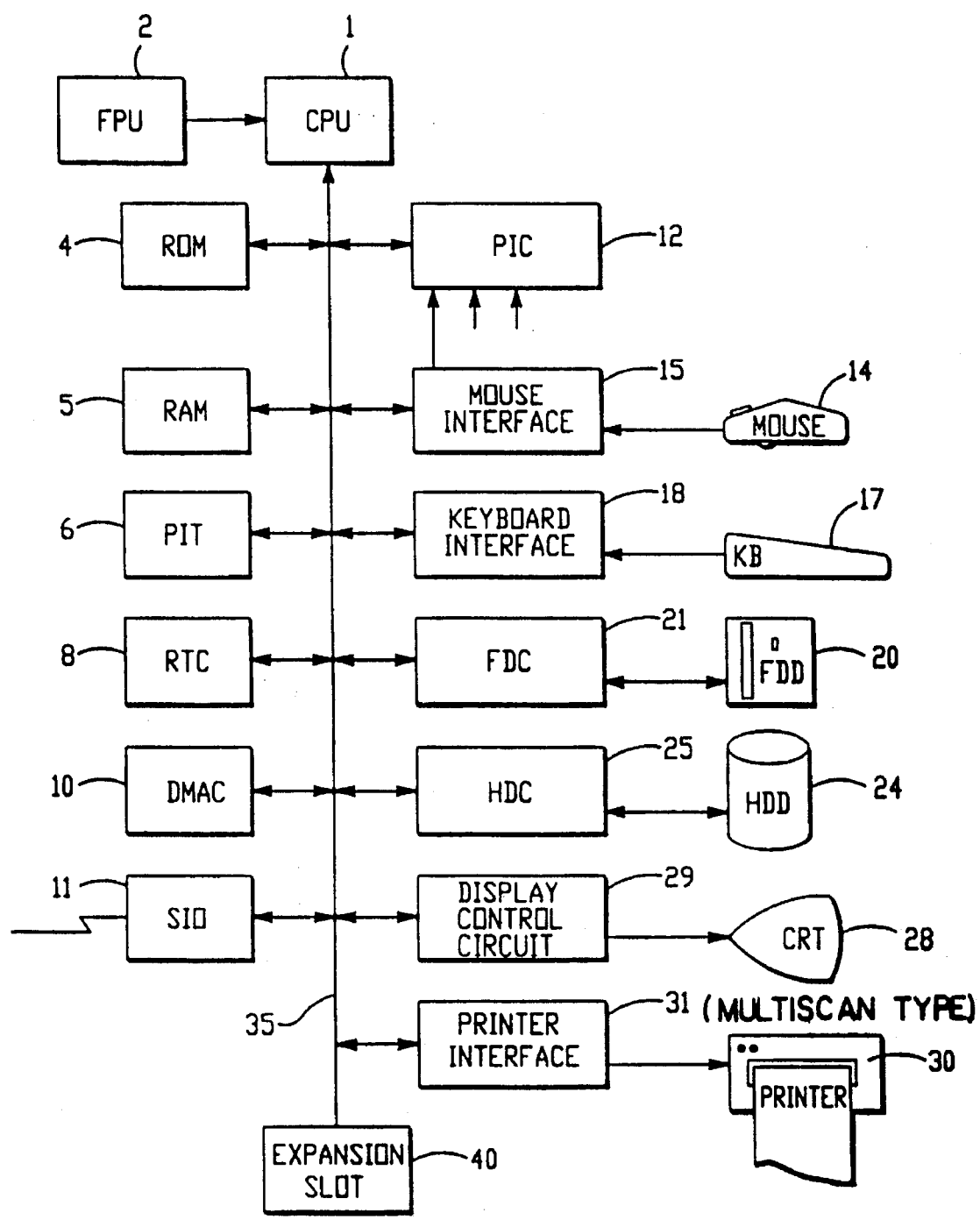
FIG. 4 is a block diagram showing the hardware configuration of the computer of the first embodiment of the invention.

FIG. 4 is a block diagram showing the hardware configuration of the computer of the first embodiment. This computer is configured as an engineering workstation, and is equipped with the following components connected to each other via a bus centering around a CPU 1. In this embodiment, a 32-bit processor (Intel's 80386) is used as CPU 1. FPU 2 is a numerical operation processor, ROM 4 is a mask memory where monitor programs, etc., are stored, RAM 5 is a read/write memory which makes up the main memory, PIT 6 is an interval timer that generates timer interrupts, RTC 8 is a real-time clock which is backed up and measures time, DMAC 10 is a controller that controls direct memory transfer via the bus, SIO 11 is a serial interface that controls RS-232C communications, PIC 12 is a interrupt controller that attaches priority to each type of interrupt and controls them, mouse interface 15 is an interface that handles the exchange of data with the mouse 14, keyboard interface 18 is an interface that handles input from a keyboard 17, FDC 21 is a floppy disk drive controller that controls floppy disk drive (FDD) 20, HDC 25 is a hard disk drive controller that controls hard disk drive (HDD) 24, display control circuit 29 is a controller that controls signal output to CRT 28, which displays necessary data, etc., and printer interface 31 is an interface that controls data output to printer 30. An expansion slot 40 is connected to bus 35 to allow for future expansion.

Figure 5:
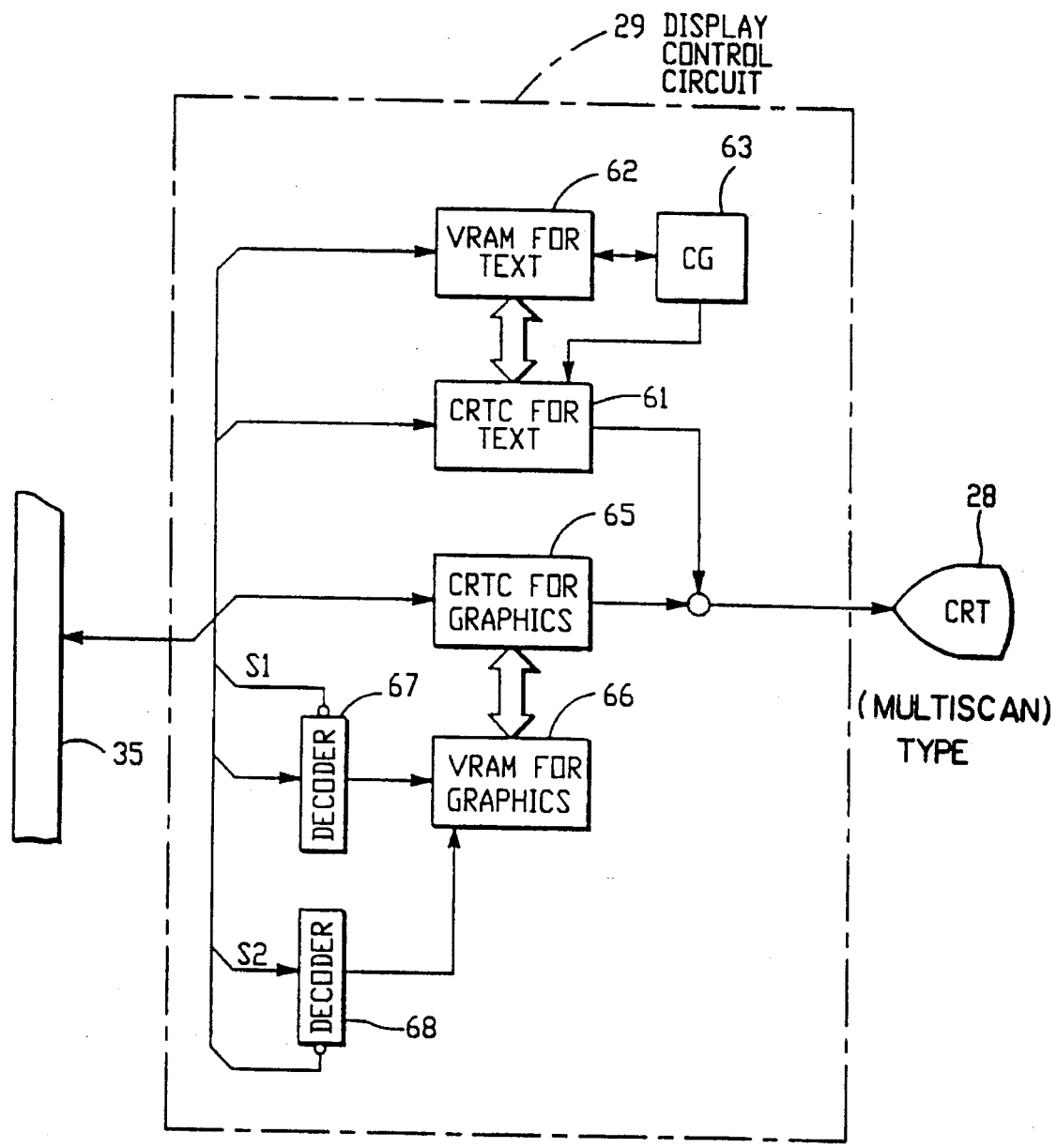
FIG. 5 is a block diagram showing the details of the configuration of display control circuit 29 in the first embodiment.

Referring to FIG. 5, display control circuit 29 is equipped with a CRTC 61 for text, a VRAM 62 for text that stores the codes of the text to be displayed, a character generator (CG) that outputs the bit maps of the characters specified by the data in VRAM 62 for text, a CRTC 65 for graphics and a VRAM 66 for graphics that stores the graphic picture data to be displayed.

Figure 6A:
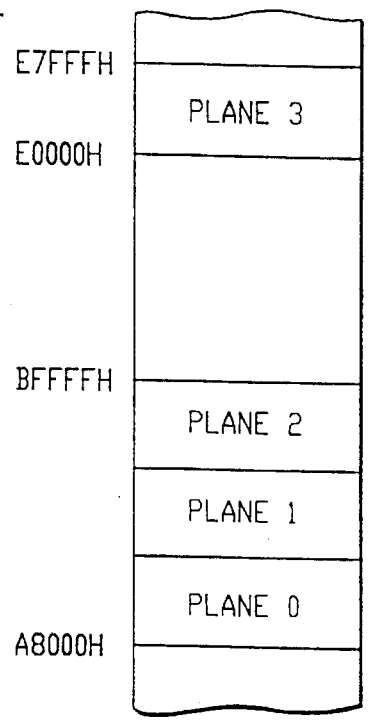
FIGS. 6A and 6B are explanatory diagrams showing the memory configuration of VRAM when normal mode is selected and when high resolution mode is selected.
Figure 6B:
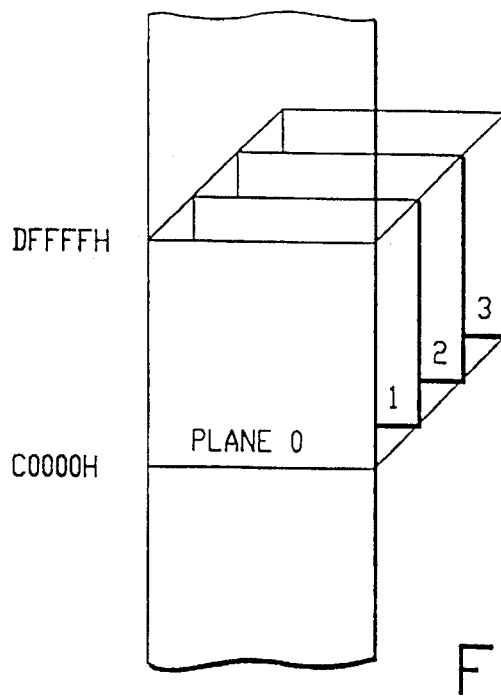

The computer of this embodiment is a high resolution mode/normal mode capable computer, and therefore the memory configuration of VRAM 66 for graphics is rearranged when normal mode is selected and when high resolution mode is selected. FIGS. 6A and 6B illustrate, the memory configurations for normal mode and high resolution mode. FIG. 6A shows four planes in normal mode, each of which is a 32-kbyte memory, and each is assigned an independent memory space. FIG. 6B shows four planes in high resolution mode, each of which is a 128-kbyte memory, and each is assigned the same memory space and is accessed by bank switching. The data for each dot of each frame becomes a selection signal for the pallet registers, which are not shown, and the color set in the selected pallet register is displayed.

Display control circuit 29 is equipped with first and second decoders 67, 68, which decode the addresses assigned VRAM 66 for graphics. When in normal mode, first decoder 67 is operated by inputting the enabling signals 1 from CPU 1 to first decoder 67 via bus 35. The addresses of planes 0 to 3 corresponding to the memory configuration shown in FIG. 6A are decoded by first decoder 67. That is, a decode signal is selectively output from first decoder 67 for the desired plane from among plane 0 corresponding to address position A8000H to AFFFFH, plane 1 corresponding to the address position B0000H to B7FFFH, plane 2 corresponding to the address position B8000H to BFFFFH and plane 3 corresponding to the address position E0000H to E7FFFH.

In high resolution mode, the second decoder is operated by inputting the enabling signal s2 from CPU 1 to second decoder 68 via bus 35. The addresses of planes 0 to 3 corresponding to the memory configuration shown in FIG. 6B are decoded by second decoder 68. That is, a decode signal is output from second decoder 68 to the VRAM, which is configured with emphasis on planes 0 to 3 at the address position C0000H to DFFFFH. The selection of planes during access is specified by the 8-bit register referred to as the mode register, and the mode register is set by writing the value to the I/O port of the address A4H.

The same general-use CRTC (µPD7220A, manufactured by Nihon Denki) is used for CRTC 61 for text and for CRTC 65 for graphics. These CRTC can change the resolution in the horizontal direction and the resolution in the vertical direction by changing the parameters written to their internal registers. FIG. 7A shows part of the CRTC internal registers and examples of the parameters, including the initial settings immediately after powering on.

Here, the register MASTER determines whether the CRTC operates as master or slave, and in this example it is set for master operation. The register SYNC defines the operating mode of the CRTC and the sync signal wave form (i.e., resolution in vertical and horizontal directions), and in this example the settings are text-graphics mixed mode, no VRAM refresh, flash mode in which drawing timing is not limited to the blanking period, etc. Also, the settings for the 1120×750 high resolution mode are shown in FIG. 7A, and the settings for the 640×400 normal mode are shown in FIG. 7B.

The register PITCH sets the number of words in the horizontal direction of the video memory, and the register ZOOM sets the enlargement (1 to 16 times) coefficient during display and the enlargement (1 to 16 times) coefficient for drawing of graphic characters. Further, the register CSRFORM sets the cursor shape during character display, and the register SCROLL sets the address for the start of display and the display area. These parameters are examples of initial settings and some may change depending on the application program being used.

Outputs of CRTC 61 for text and CRTC 65 for graphics are output to CRT 28 as video signals.

Figure 1:
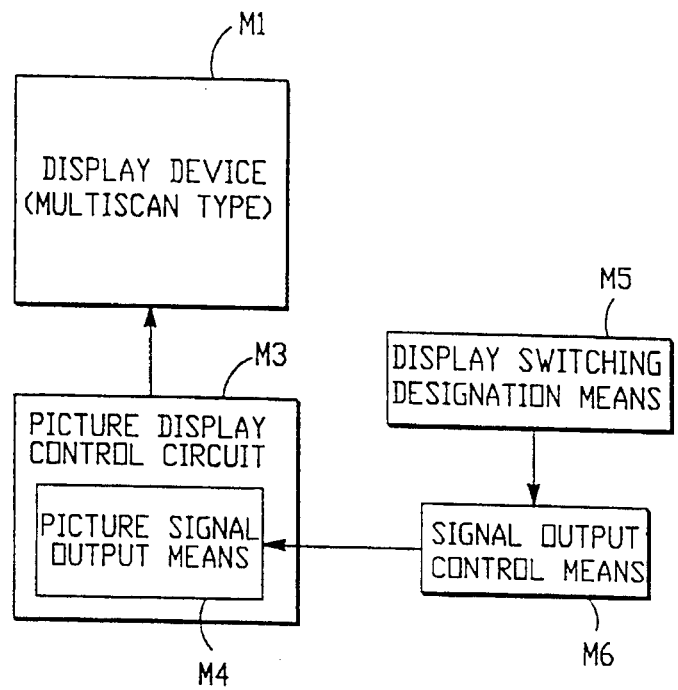
FIG. 1 is a block diagram showing an example of the basic configuration of the first computer of the invention.
Figure 2:
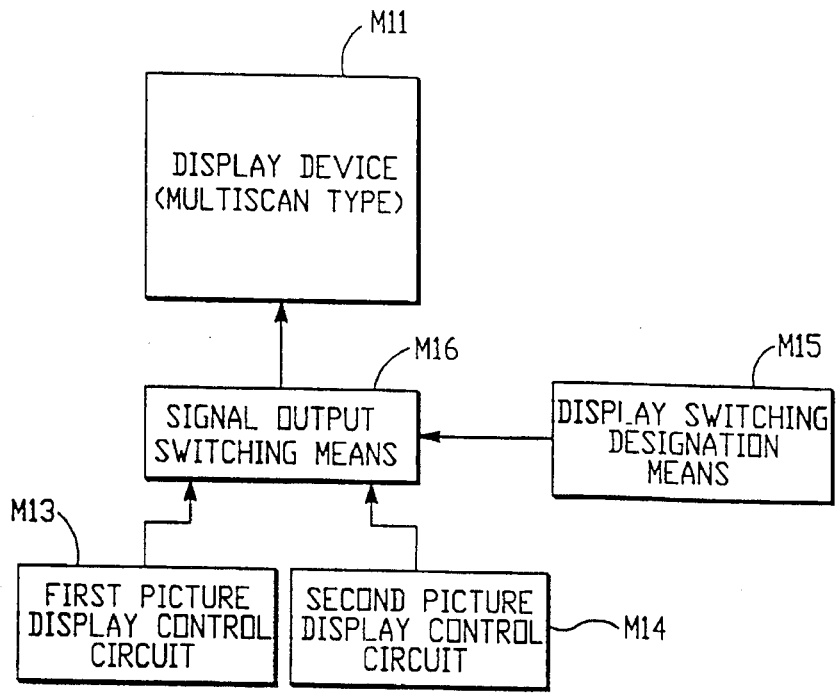
FIG. 2 is a block diagram showing an example of the basic configuration of the second computer of the invention.
Figure 3:
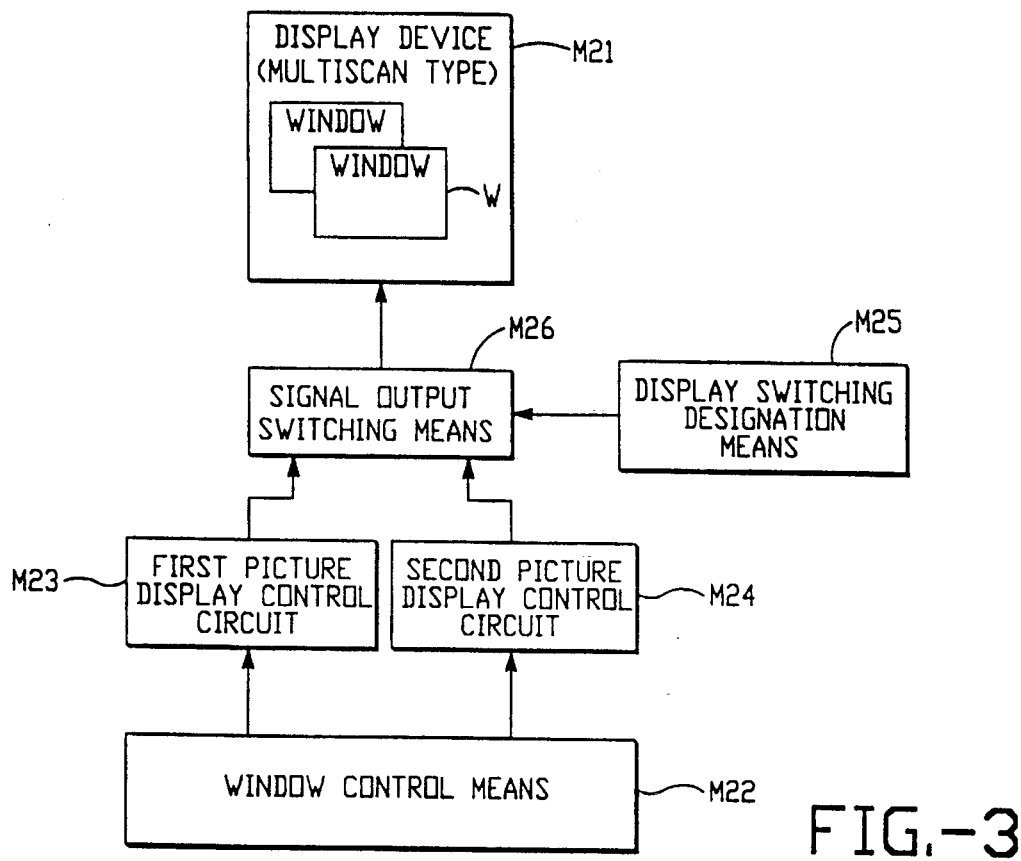
FIG. 3 is a block diagram showing an example of the basic configuration of the third computer of the invention.
Figure 9:
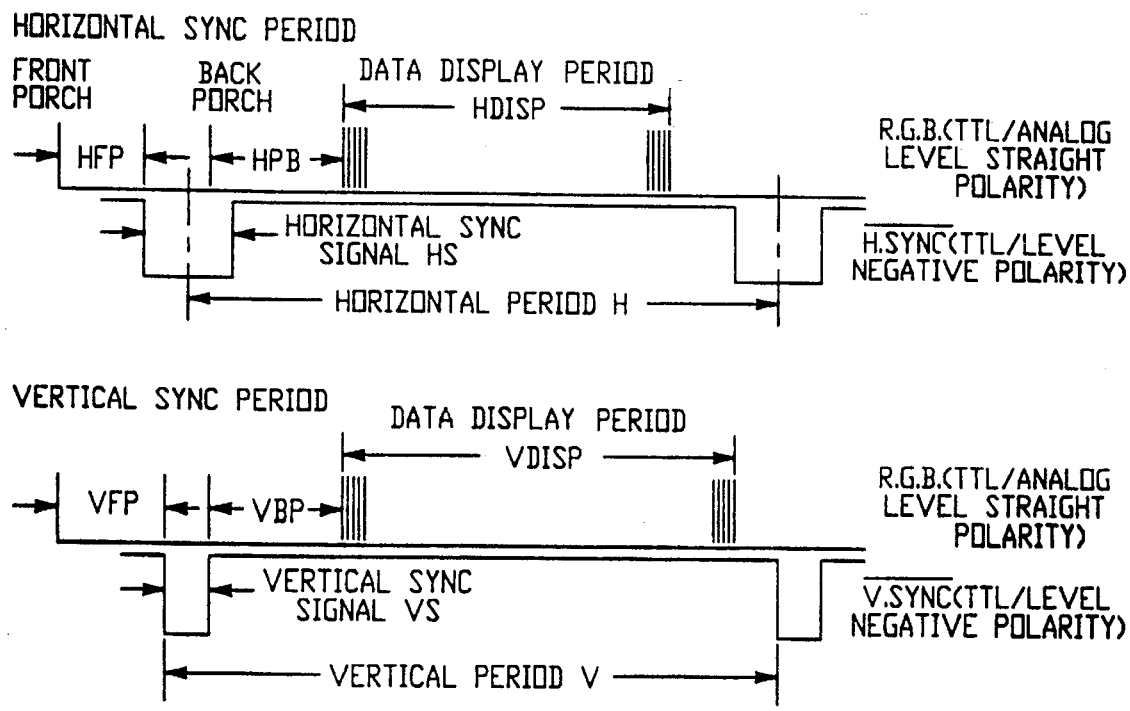
FIG. 9 is a timing chart showing the timing of the picture signal in display control circuit 29 for same.

The settings of the CRTC in display control circuit 29 are different for high resolution mode and for normal mode, and the horizontal deflection frequency of the signal output in each mode is different. In the initial settings the horizontal period H (value in parentheses is the horizontal deflection frequency) of the picture signal is 32.84 kHz as shown in FIG. 8A. In the settings for normal mode, the horizontal deflection frequency of the second picture signal is 24.83 kHz as shown in FIG. 8B. The definitions for HFP, HBP, HDISP and other abbreviations shown in FIGS. 8A, 8B are given in FIG. 9.

CRT 28 is a multi-scan type, and the horizontal deflection frequency automatically switches between 15 and 34 kHz according to the picture signal. CRT 28 detects the sync frequency SYNC of the input picture signal and causes the horizontal deflection frequency to follow it. More specifically, the horizontal deflection frequency is oscillated by separating the horizontal sync signal, and this signal is input to a frequency/voltage (F/V) converter and makes the voltage of the horizontal output stage variable. Therefore, even if the horizontal deflection frequency of the picture signal should differ, normal sync is obtained and an image matching the size of CRT 28 screen can be displayed.

In the computer display system with the above configuration, a multi-window, multi-tasking, time-sharing main Operating System (OS) is used as the OS, and each task is assigned one window. Each application program operates in the environment of the window to which it is assigned. In this embodiment, a slave OS is assigned to one subordinate process. Beginning with mouse 14, keyboard 17, floppy disk drive 20 and other peripheral devices are all under the control of the main OS, and data is passed back and forth between the application programs executed on the main OS or the application programs executed on the slave OS via so-called device drivers built into the main OS.

Figure 10:
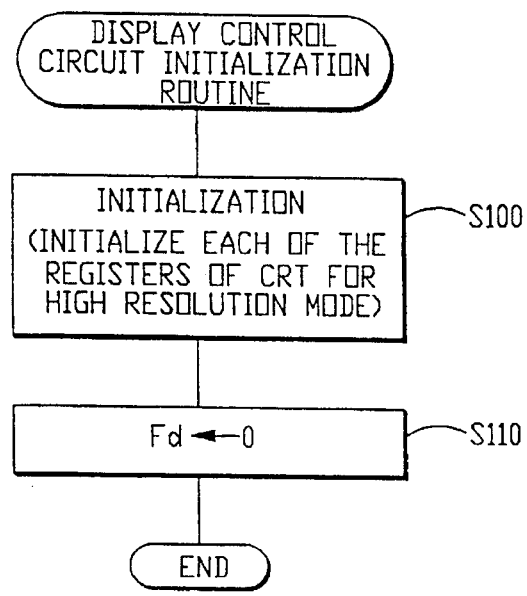
FIG. 10 is a timing chart showing the display control circuit initialization routine in the first embodiment.

The computer of the embodiment executes the display control circuit initialization routine shown in FIG. 10 together with processing other initialization after powering on. That is, processing of initialization for high resolution mode (step S100), which sets the parameters, for which examples are shown in FIG. 7A, in each of the registers of CRTC 61 and 65 is performed. Next, flag Fd is set to level 0 to indicate that high resolution mode has been selected (step S110), after which the routine escapes to END and is terminated.

After initialization processing, display of the initial screen is performed under the control of the main OS. The main OS controls the display screen in the 1120×750-dot high resolution mode. The slave OS assigned as a subordinate process of the main OS, however, can only control a display screen in the 640×400-dot normal mode.

Figure 12:
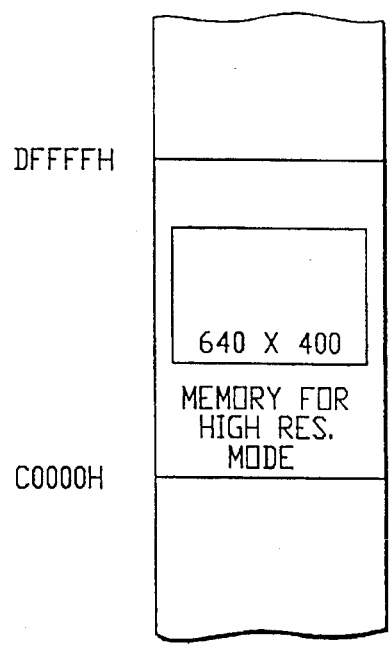
FIG. 12 is an explanatory diagram showing the data written by the slave OS mapped in the memory for high resolution in VRAM.
Figure 11A:
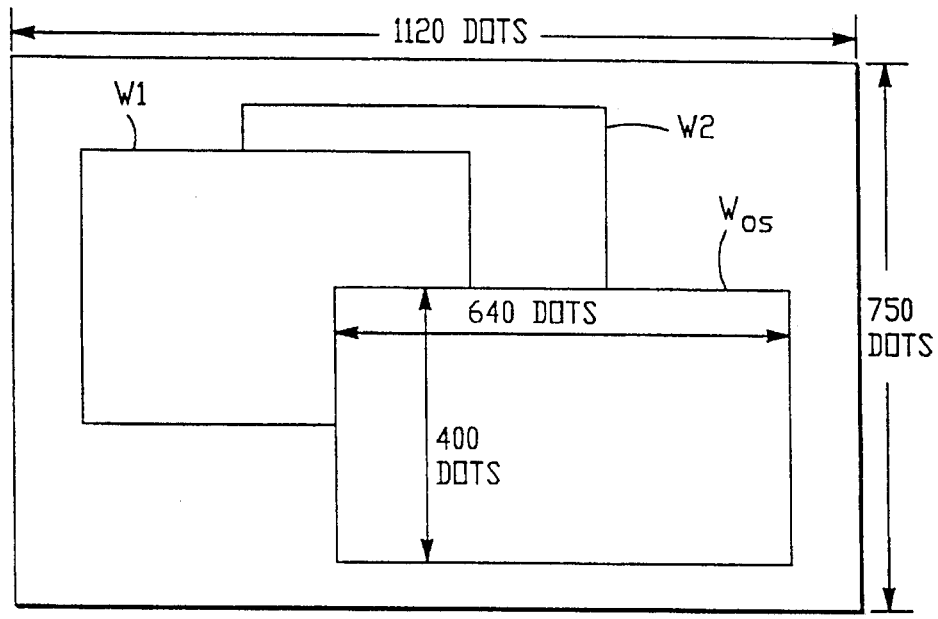
FIGS. 11A and 11B are explanatory diagrams showing the resolution of the multi-window display by the main OS and the resolution of the display screen of the slave OS.

FIG. 11A shows a condition under the control of the main OS in which the window Wos running on the slave OS is opened along with windows W1 and W2 under the direct control of application programs running on the main OS. Window Wos of the slave OS has a size of 640×400. The technique of displaying a 640×400-dot window on a 1120×750-dot screen is similar to displaying a regular window and is explained below. That is, the application program running on the slave OS writes picture data to the VRAM with a memory configuration for normal mode, and then the main OS converts the addresses and writes the 640×400-dot window data to the memory for high resolution as shown in FIG. 12 by mapping the data written by the slave OS to prescribed addresses in the VRAM 62 and 66 when high resolution mode is selected. In this way, a 640×400-dot window is displayed in the 1120×750-dot screen.

Operation of Hot Keys

Figure 13A:
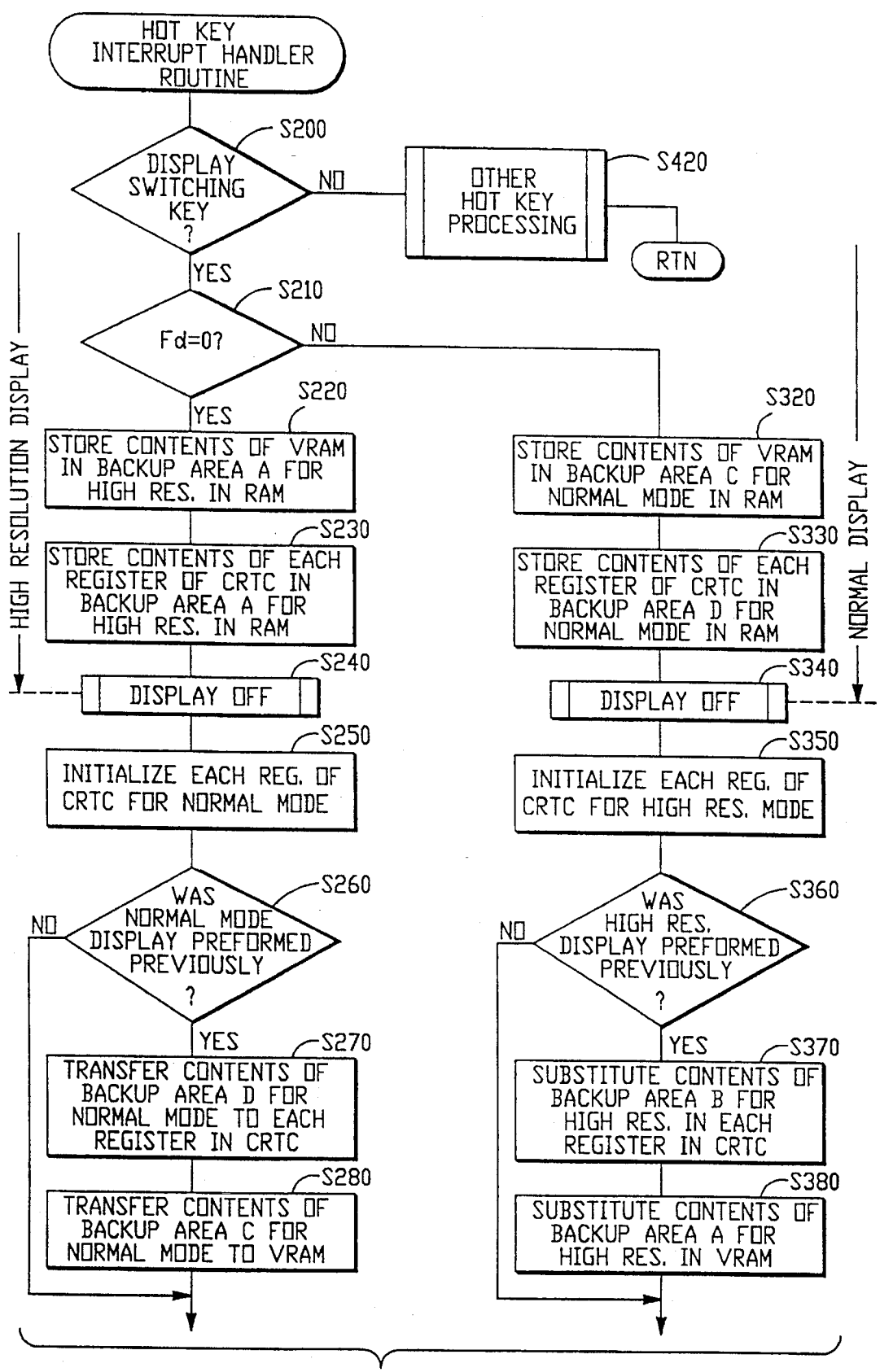
FIGS. 13A and 13B are flowcharts showing the hot key interrupt handler routine in the first embodiment.
Figure 13B:
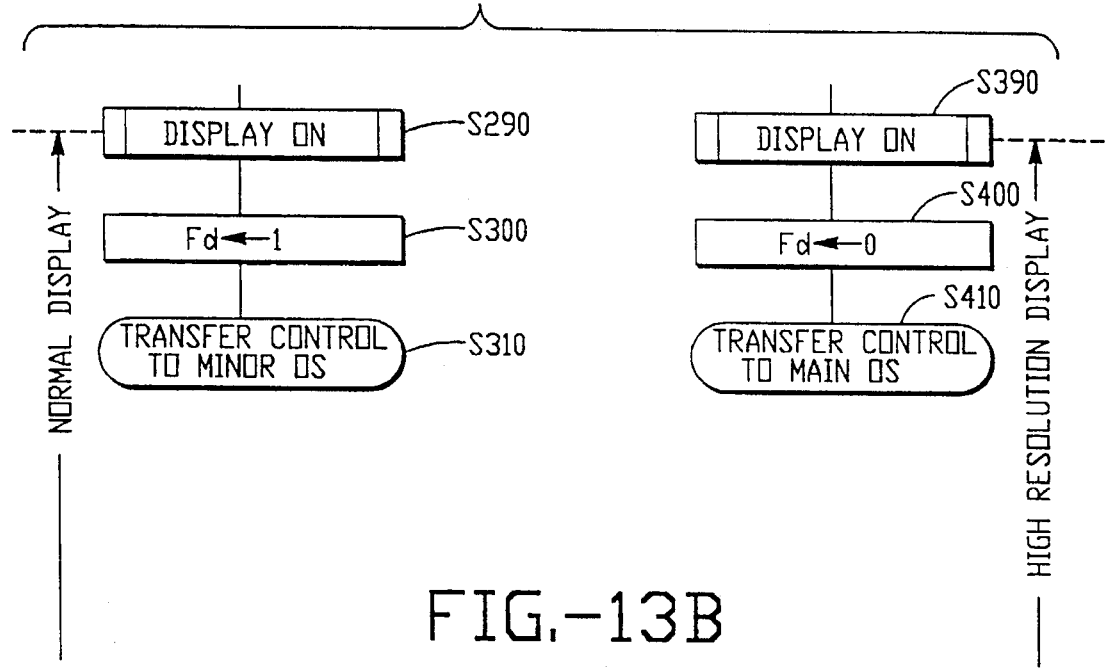
Figure 16:
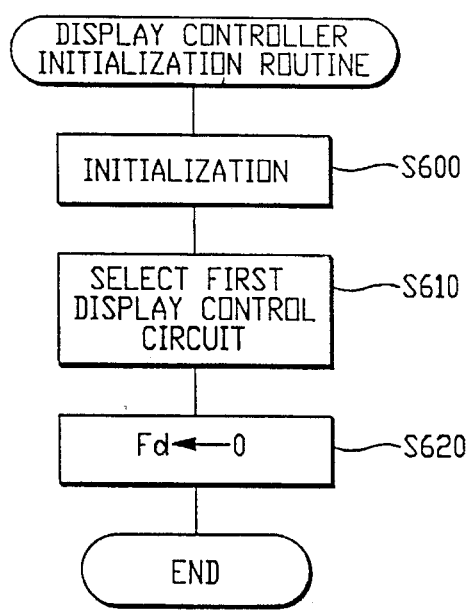
FIG. 16 is a flowchart showing the display controller initialization routine in the second embodiment.

A number of hot keys are assigned on keyboard 17, and when those keys are operated, the hot key interrupt handler routine shown in FIG. 13 is executed. When this handler routine is initiated by an interrupt, processing is first performed that determines whether the keys that were operated are display switching keys that switch the display of windows (step S200). If the key operation was the simultaneous pressing of GRPH+W, they are judged to be a window display switching keys, and then the logic level of flag Fd, which indicates high resolution mode or normal mode, is evaluated as to whether high resolution mode is set (step S210). GRPH is a key on keyboards manufactured for domestic use in Japan. In the present invention, operation of this key (in conjunction with some other predetermined key) initiates hot key processing.

When high resolution mode is selected (Fd=0), such as immediately after power on, data transfer is performed assuming the transfer of control to the slave OS, which is a subordinate process of the main OS. That is, the contents of VRAMs 62, 66 are temporarily stored in the backup area A for high resolution in RAM 5 (step S220), and the parameters, etc., set in each of the registers of the CRTCs 61, 65 are temporarily stored in the backup area B for high resolution in RAM 5 (step S230).

Specifically, processing step S220 in which the contents of VRAM 66 for graphics are stored in backup area A for high resolution in RAM 5 when in high resolution mode specifies plane 0 by means of second decoder 68, reads out the contents of addresses C0000H to DFFFFH, writes the contents that were read to RAM 5, then specifies plane 0 by means of decoder 68, performs the same read/write processing, and then specifies planes 2 and 3 in order by means of decoder 68 and performs the same read/write processing for planes 2 and 3. In this way, the contents of VRAM 66 for graphics are transferred to RAM 5.

Transfer of the contents of VRAM 66 for graphics to RAM 5 when in normal mode is performed in step S320 described below, but transfer processing in normal mode is performed as follows. That is, the contents of addresses A8000H to E7FFFH and E0000H to E7FFFH are sequentially read out using first decoder 67 and written to RAM 5. Therefore, whether in high resolution mode or normal mode, the transfer of the contents of VRAM 66 to RAM 5 differs only in the address location of the origin of transfer, and each of the processes executed can be continued without being affected by the switching of high resolution mode or normal mode. Likewise, the transfer of the contents of RAM 5 to VRAM 6 6 differs only in the address location of the target of transfer whether in high resolution mode or normal mode, and each of the processes executed can be continued without being affected by the switching of high resolution mode or normal mode.

After executing step S230, output of the picture signal from display control circuit 29 is stopped and display on CRT 28 is temporarily switched off (step S240). Subsequently, initialization for normal mode is performed which sets the parameters, etc., shown as examples in FIG. 7B in each of the registers of CRTCs 61, 65 (step S250).

Next, after powering on the computer, it is determined whether display in normal mode has been performed (step S260), and if it is so determined then the following processing is performed. That is, processing is performed that transfers the parameters and other contents regarding display that were purged (purged in step S320 described below) in advance to the backup area D for normal mode in RAM 5 when display was previously executed in normal mode to each of the registers in CRTCs 61, 65 (step S270), and processing is performed that transfers the picture data for normal display that was purged (in step S330 described below) in advance to the backup area C for normal mode in RAM 5 when display was previously executed in normal mode to VRAMs 62, 66 (step S280). Following this, output of the picture signal from display control circuit 29 is enabled and display on CRT 28 is switched on (step S290) and flag Fd is set to level 1 (step S300).

When it is determined that this is the first normal display by display switching, in step S260, then the processing in steps S270 and S280 is skipped (as a result, the parameters and other contents stored in each of the registers in CRTCs 61, 65 remain at the initial settings for normal mode set in step S250), i.e., display on CRT 28 is immediately switched on.

Figure 11B:
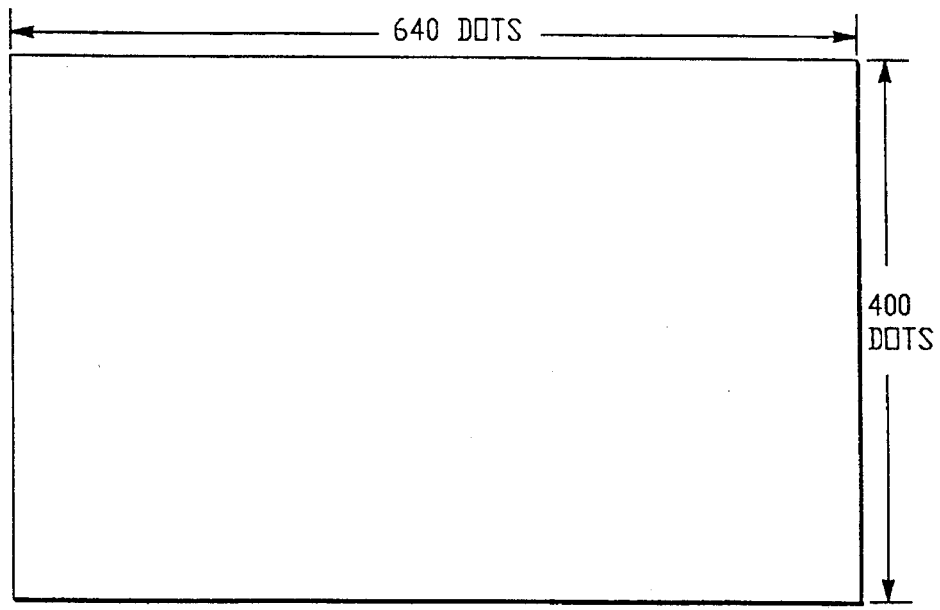

This results in switching from the multi-window screen (1120×750-dot high resolution mode screen) controlled by the main OS, an example of which is shown in FIG. 11A, to the screen under the control of the slave OS, an example of which is shown in FIG. 11B. This screen has a normal mode resolution of 640×400 dots. Since CRT 28 is a multi-scan type, it immediately follows any change in the frequency of the picture signal and displays a normal screen. Following this, control is transferred to the slave OS (step S310).

However, if display in the normal had been performed and the judgment in step S210 was NO (Fd≠0), data transfer is performed assuming control will be transferred from the slave OS, which is a subordinate process of the main OS, to the main OS (step S260). That is, the contents of VRAMs 62, 66 are temporarily purged (stored) to the backup area C for normal mode in RAM 5 (step S320) and the parameters, etc., set in each of the registers of CRTCs 61, 65 are temporarily stored to the backup area D for normal mode in RAM 5 (step S330). Output of the picture signal from display control circuit 29 is then stopped and display on CRT 28 is temporarily switched off (step S340).

After executing step S340, processing is performed that initialization for high resolution mode is performed that sets the parameters, examples of which are shown in FIG. 7A, in each of the registers of CRTCs 61, 65 (step S350).

After powering on the computer, it is determined whether display in high resolution mode has already been performed (step S360), and if it has already been performed, the following processing is performed. That is, processing is performed that transfers the parameters and other contents regarding display that were purged (purged in step S220) in advance to the backup area B for high resolution in RAM 5 when display was previously executed in high resolution mode to each of the registers in CRTCs 61, 65 (step S370), and processing is performed that transfers the picture data for high resolution display that were purged (purged in step S220) in advance to the backup area A for high resolution in RAM 5 when display was previously executed in high resolution mode to VRAMs 62, 66 (step S380). Subsequently, output of the picture signal from display control circuit 29 is enabled and display on CRT 28 is switched on (step S390) and flag Fd is set to level 0 (step S400).

When it is determined that this is the first high resolution display by display switching, in step S360, then the processing in steps S370 and S380 is skipped (as a result, the parameters and other contents stored in each of the registers in CRTCs 61, 65 remain at the initial settings for high resolution set in step S350), i.e., display on CRT 28 is immediately switched on.

With reference to FIGS. 11A and 11B this results in returning to the multi-window screen controlled by the main OS, from the screen (640×400-dot normal mode screen) under the control of the slave OS. This screen has a high resolution of 1120×750 dots. The reason why CRT 28 is able to maintain a normal screen even when the frequency of the picture signal switches is the same as when switching from high resolution mode to normal mode. Control is then transferred to the main OS (step S410).

When hot keys are operated, if the operated keys are not display switching keys (step S200) and are another type of key, then processing is performed that locks a window, quits, etc., (step S420) and this routine is terminated.

Figure 14A:
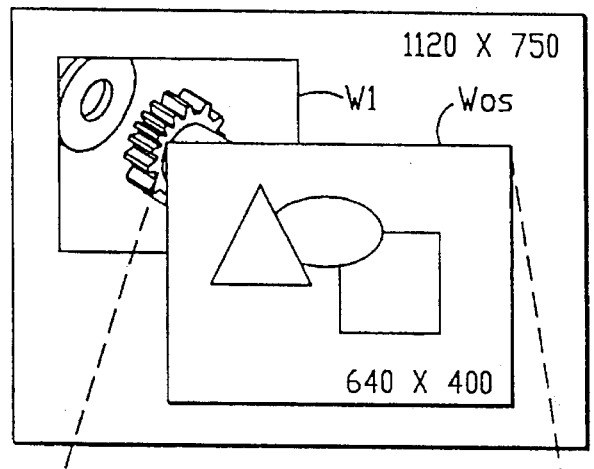
FIGS. 14A–14C are explanatory diagrams showing an example of display switching in the embodiment.

The switching of screens by means of hot keys need not be limited to switching from the display screen of the main OS to the display screen of the slave OS as shown in FIG. 11A. For example, in FIG. 14A, the two windows W1 and Wos being controlled by the main OS are displayed at a resolution of 1120×750 dots, but not only can the window Wos controlled by the slave OS and displayed as one of the being displayed (640×400 dots) so that it fills up the entire screen of the CRT as shown in FIG. 14B, switching can be performed that displays (1120×750 dots) the window W1 assigned to an application under the control of the main OS in the entire screen as shown in FIG. 14C.

Figure 14B:
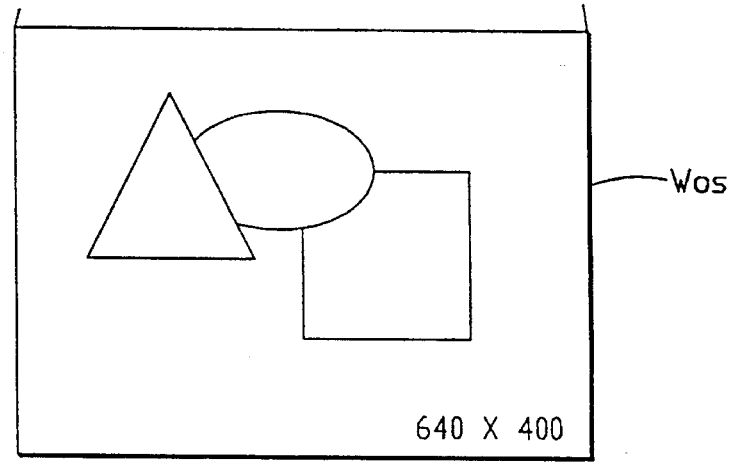
Figure 14C:
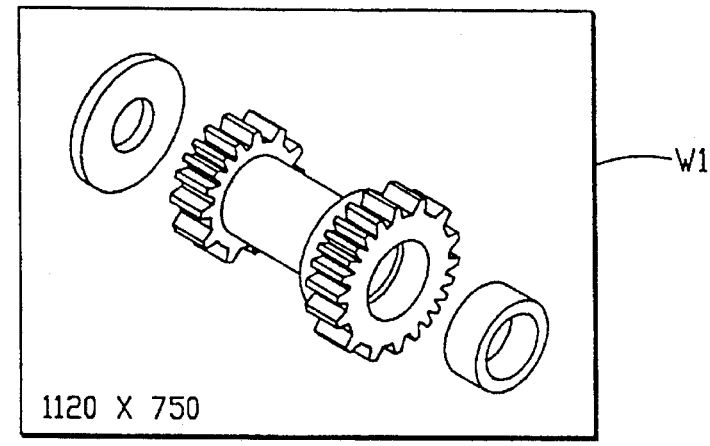

In this case, the window Wos of the slave OS is a 640×400-dot window even during display as an original multi-window, and its normal display is shown in FIG. 14B. Note, the size of the object being displayed is enlarged, thus improving viewability for the user. When window W1 of the main OS application is displayed on the full screen (FIG. 14C) while retaining its original resolution (1120×750), normally the size of the object being displayed does not change and only the area displayed is enlarged. Here, instead of enlarging the display area, the size of the object being displayed can be enlarged. If the size of the object is enlarged, the resolution can either be kept at the number of dots making up the original window W1, e.g., 600×350 dots, to give priority to shortening the time required for drawing the screen, or be set to 1120×750 dots to give priority to display detail.

Also in this embodiment, the hot key assignments are simplified by assigning the hot keys for display switching to CTRL+W and performing a toggle operation each time these keys are operated, but it is possible, for example, to assign selection of the 1120×750-dot screen of the main OS to GRPH+f1 (first function key; same below) and selection of the 640×400-dot screen of the slave OS to GRPH+f2. Further, when multiple windows are being displayed under the control of the main OS, the selection of each window can be assigned in sequence to function keys. In this case, one of multiple windows can be easily selected, thus improving control when three or more screens are often switched.

As described above, this embodiment makes it possible to switch the entire CRT 28 screen to a lower resolution screen under the control of a slave OS, and to continue normal display even when switching from a screen with a high resolution to a screen with a low resolution. Therefore, even in cases in which a slave OS, which can only display at a resolution that is lower than the resolution of the main OS, is assigned to a subordinate process of the main OS and is executed, it is possible to enlarge the screen controlled by the slave OS to full size and display it.

Second Embodiment

In the system of the second embodiment, the configuration of display control circuit 29, the display control circuit initialization routine, and the hot key interrupt handler routines, are different from those in the first embodiment, and all other configurations are the same.

The first embodiment of the present invention had only one display control circuit 29, but the second embodiment has two display control circuits, one each for high resolution mode and normal mode.

Figure 15:
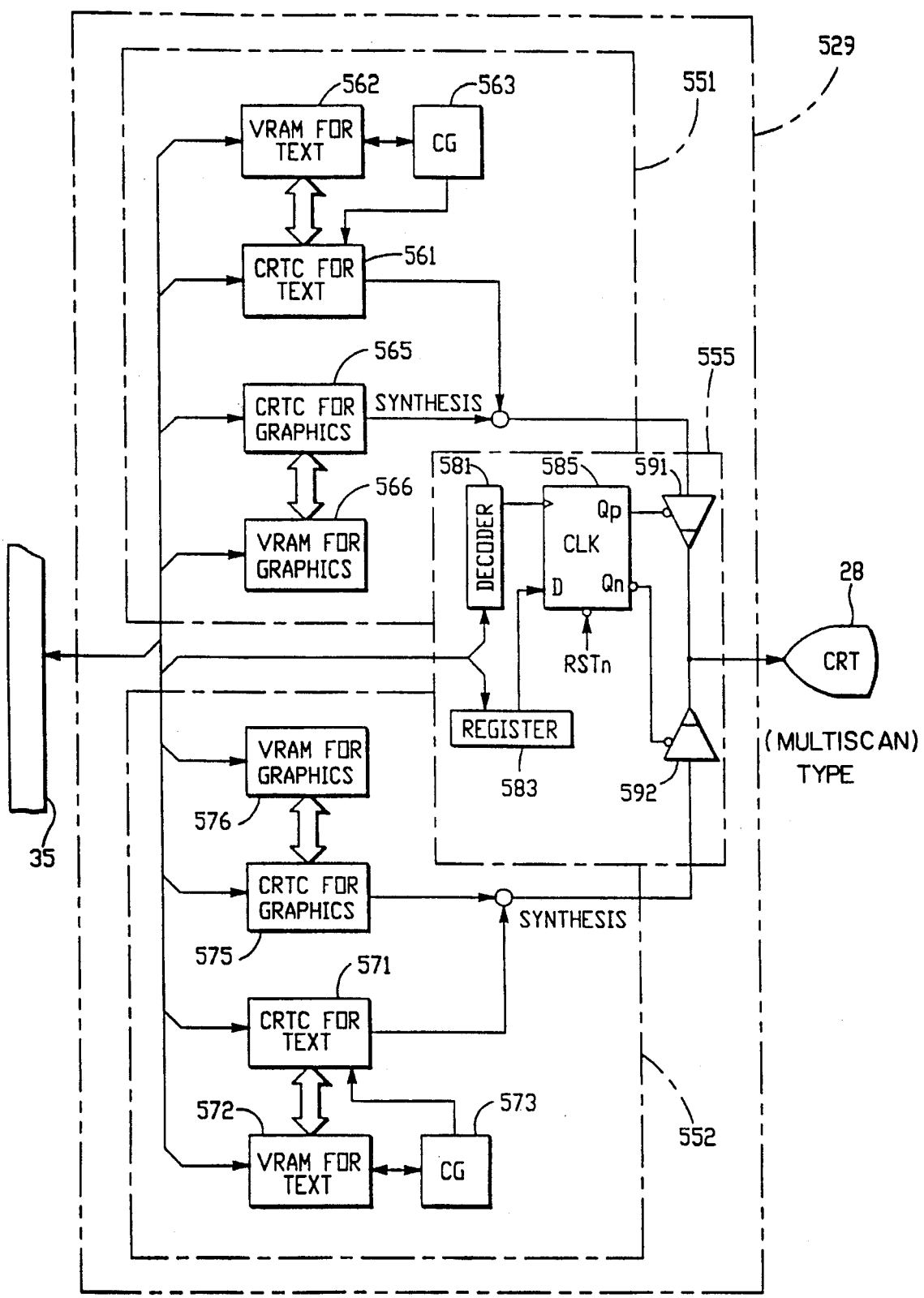
FIG. 15 is a block diagram showing the details of the configuration of the display controller 70 in the second embodiment.

Referring to FIG. 15, display controller 529, which is equivalent to display control circuit 29 in the first embodiment, comprises first display control circuit 551, second display control circuit 552 and display switching circuit 555. First and second display control circuits 551,552 have the same configuration except for the capacity of the VRAM. That is, first and second display control circuits 551,552 are each equipped with CRTCs 561,571 for text, VRAMs 562, 572 for text, character generators (CG) 563, 573, CRTCs 565,575 for graphics and VRAMs 566,576 for graphics.

The configurations of first and second display control circuits 551,552 are nearly the same, and except for the absence of decoders 67, 68, they have nearly the same configuration as display control circuit 2 9 in the first embodiment. The parameters established for high resolution mode shown in FIG. 7A are initially set in the registers of CRTC 565 in first display control circuit 551, and the parameters established for normal mode shown in FIG. 7B are initially set in the registers of CRTC 575 in second display control circuit 552.

Each of the picture signals output from first and second display control circuits 551, 552 are output to display switching circuit 555. Display switching circuit 555 selectively outputs the first picture signal from first display control circuit 551 and the second picture signal from second display control circuit 552 to CRT 28. Display switching circuit 555 comprises decoder 581, which decodes the addresses assigned to the circuit, register 583 provided for switching, D-type flip-flop 585, which receives the output of register 583 as data D and is clocked by the output of decoder 581, and drivers 591, 592, whose output condition is controlled by D-type flip-flop 585 outputs Qp and Qn have which mutually inverted logic.

When the address for switching is accessed, decoder 581 detects it and a pulse signal is output to D-type flip-flop 585 after the data which indicates which of first and second display control circuits 551,552 has been selected is written to register 583 by CPU 1 via bus 35, the outputs Qp and Qn of D-type flip-flop 585 are determined according to the output (data D) of the register 583 at that time. Outputs Qp and Qn are connected to the gate terminals of drivers 591, 592. Since the outputs of drivers 591, 592 go to a high impedance state when the gate inputs are high, CRT 28 receives either the first or second picture signals via drivers 591,592, as shown in FIG. 15.

Display Control Initialization Routine

When processing begins, CPU 1 performs initialization that sets the parameters, examples of which are shown in FIGS. 7A and 7B, in each of the registers of CRTCs 561, 565, 571 and 575 (step S100), and then it accesses display switching circuit 555 and performs processing that selects first display control circuit 551 (step S610). Following this, flag Fd is set to a logic 0 to indicate that first display control circuit 551 has been selected (step S620) and the routine escapes to END and is terminated.

Upon completion of initialization processing, first display control circuit 551 is enabled and the initial screen is displayed under the control of the main OS which controls a 1120×750-dot display screen.

Hot Key Interrupt Handler Routine

Figure 17:
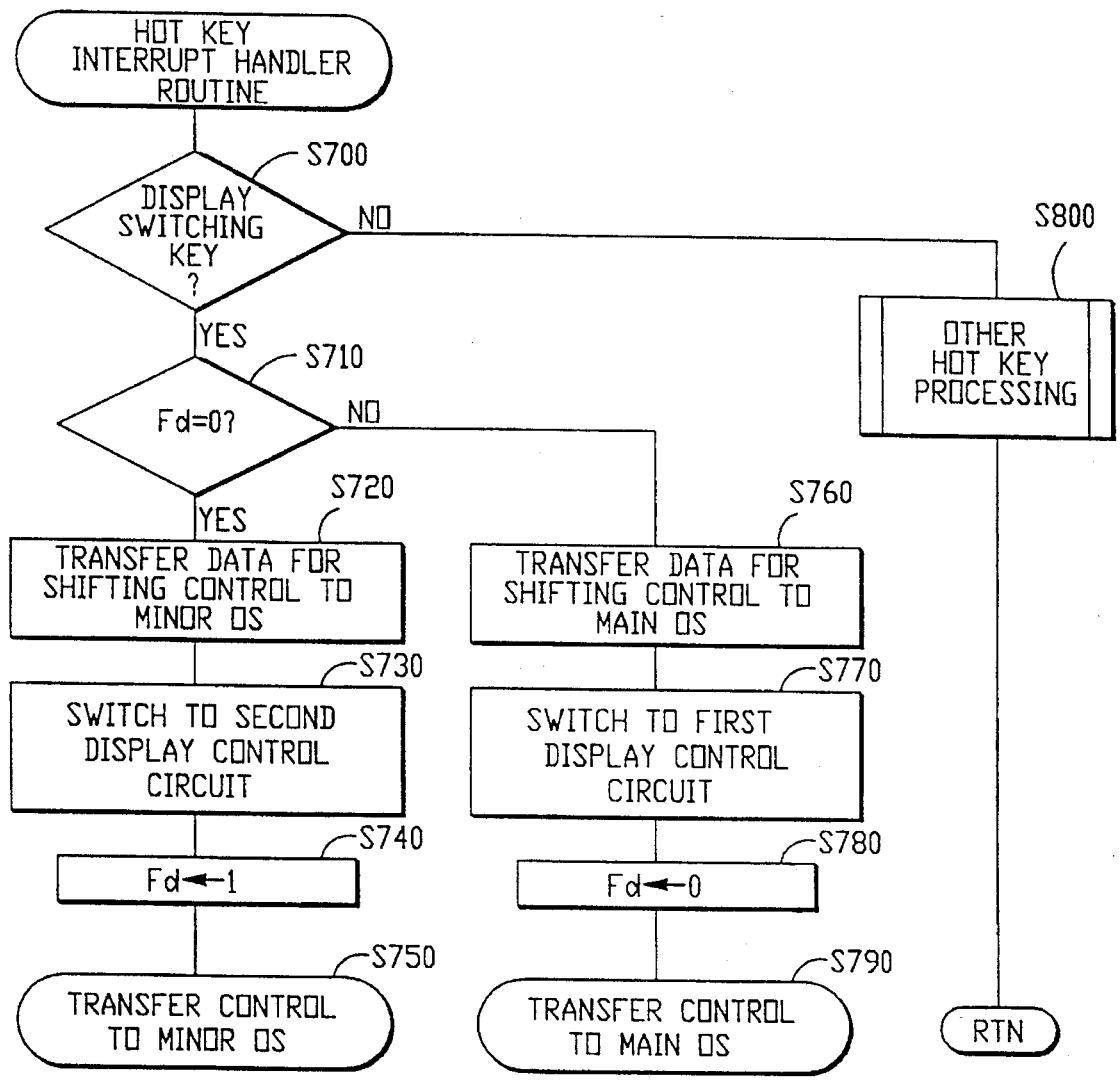
FIG. 17 is a flowchart showing the hot key interrupt handler routine in the second embodiment.

When hot keys are operated a hot key interrupt handler routine is executed as shown in FIG. 17. When this handler routine is initiated by an interrupt, processing is first performed to determine whether the operated keys are display switching keys (step S700). If the key operation was the simultaneous pressing of GRPH+W, then the keys are judged to switch window display, and a test is performed to determine the logical state of flag Fd (step S710).

When first display control circuit 551 is used immediately after power-on (Fd=0), then data transfer is performed assuming control will be transferred to the slave OS, which is a subordinate process of the main OS (step S720). Data transfer is performed using DMAC 10 when transferring at least part of the application program running on the slave OS to the main memory, whereby transfer time is shortened. If the application program is already present and only status information is transferred, then transfer can be performed under control of CPU 1.

Processing is then performed that writes prescribed values to the registers of display switching circuit 555 and switches to second display control circuit 552 (step S730), and flag Fd is set high (step S740). As a result, second display control circuit 552 becomes active in display controller 529, and the multi-window screen under the control of the main OS, as example of which is shown in FIG. 11A, is switched to the screen under the control of the slave OS, an example of which is shown in FIG. 11B. This screen has a resolution of 640×400 dots. Since CRT 28 is a multi-scan type, it follows any change in the frequency of the picture signal and displays a normal screen. Control is then shifted to the slave OS (step S750).

If display is being performed by second display control circuit 552 and the decision in step S710 is NO (Fd≠0), then data transfer is performed assuming control will be shifted from the slave OS, to the main OS (step S760). Data transfer can be performed using DMAC 10 as described above or under control of CPU 1. A prescribed value is then written to the register of display switching circuit 555, processing is performed that switches to first display control circuit 551 (step S770) and flag Fd is made low (step S780). As a result, first display control circuit 551 becomes active in display controller 529, and display is returned to the multi-window screen controlled by the main OS, an example of which is shown in FIG. 11A. This screen has a resolution of 1120× 750 dots. The reason why CRT 28 is able to maintain a normal screen even when the frequency of the picture signal changes is the same as when switching from first display control circuit 551 to second display control circuit 552. Following this, control is shifted to the main OS (step S790).

When hot keys are operated, and the operated keys are not display switching keys (step S700), then processing is performed that locks a window, quits, etc., (step S800) and this routine is terminated.

As in the first embodiment, the system of the second embodiment can switch the entire screen of CRT 28 to a lower resolution controlled by the slave OS by operating hot keys, and it can continue normal display when switching from a high resolution screen to a low resolution screen. Therefore, when a slave OS, which can only display at a resolution that is lower than the resolution of the main OS, is assigned to a subordinate process of the main OS and executed, it is possible to enlarge the screen controlled by the slave OS to full size and display it as in the first embodiment.

Also, since doubling of the display control circuit is achieved by providing first and second display control circuits 551, 552, little overhead is required for switching display. That is because the prescribed information is written to register 583 of display switching circuit 555 without purging the contents of the VRAM and the CRTC registers, and only first and second display control circuits 551, 552 need be switched, and therefore no time is required for switching display.

It is also possible to perform the processing required to redraw the image in the background. This is explained using an example in which one application is run on the main OS and one application is run on the slave OS. Display is switched to the application running on the slave OS and is shown in full size. The application running on the main OS goes to the background, and by allotting a prescribed amount of time by means of time sharing to the background, processing being executed in the background can be executed even if it requires rewriting of the screen. In the prior art, processing in the background was limited to compiling and other processing not requiring screen rewrite since the VRAM could not be rewritten.

The first and second embodiments were configured such that applications under the control of the main OS and applications under control of the slave OS operated under the environment of the windows assigned them, but it is not necessary to limit the invention to this configuration. A configuration is possible in which an application under the control of the main OS and an application under the control of the slave OS operate independently in environments that do not use windows and display is switched from the display screen of the main OS which has a resolution of 1120×750 dots to the display screen of the slave OS which has a resolution of 640×400 dots.

Effectiveness of the Invention

In the first embodiment of the present invention, when switching of the display between a first resolution image and a second resolution image is designated, the selected image signal is output to the display device, which is a multi-scan type video display, and either picture is displayed normally. Therefore, when switching is designated, the screen can be switched quickly and easily without having to quit the application (that forms the screen prior to switching), turn off the power to the system, or perform other operations, thereby improving ease of use.

The same effect is obtained in the second embodiment. Further, the picture display control circuit is doubled up by providing first and second picture display control circuits, whereby little overhead is required for display switching.

In the third embodiment, when windows of a prescribed size are opened, a minor operating system executed as a subordinate process of the main operating system is assigned to one of the windows and the switching of display between the entire screen including the window and the window is designated, the picture signal designated by the switching from among the picture signal from the first picture display control circuit M23 with resolution M×N and the picture signal from the second picture display control circuit with resolution P×Q, which is a lower resolution, is output to the display device, which is a multi-scan type video display, and either one is displayed normally. Therefore, in the environment of the window of the slave OS, which supports only display at the resolution P×Q and is being executed as a subordinate process of the main OS, switching of display between the slave OS and the main OS can be performed quickly and easily, and ease of use is improved under this environment.

While the invention has been described in conjunction with several specific embodiments, it is evident to those skilled in the art that many further alternatives, modifications and variations will be apparent in light of the foregoing description. For example, a configuration with three or more display control circuits, a configuration that uses a common VRAM for each of the display control circuits, a configuration that performs switching of windows by means of a dedicated key instead of hot keys, and a configuration that performs switching by triple-clicking a mouse button are possible. Thus, the invention described herein is intended to embrace all such alternatives, modifications, applications and variations as may fall within the spirit and scope of the subjoined claims.

What is claimed is:

1. A computer system having a dynamically adjustable display resolution for computer generated displays, comprising:

a) a multi-scan type monitor having at least high and low deflection frequencies which correspond to at least high and low resolution synchronizing signals, respectively, said multi-scan type monitor having a viewable area;

b) a main operating system means for controlling formation of a first image on the entire viewable area of said multi-scan type monitor, said first image including at least one window, and for associating a minor operating system means to said window, said minor operating system means being executed as a subordinate process of said main operating system means, wherein said first image has a resolution of M×N where M and N are integers;

c) said minor operating system means controlling formation of a second image, wherein said second image corresponds to image data in said window of said first image and has a resolution of P×Q, where P and Q are integers, P is less than M, and Q is less than N; and d) a display switching means, coupled to said multi-scan type monitor and to said main operating system means, for switching dynamically between said first image and said second image, wherein said display switching means comprises a means for generating the low resolution synchronizing signal when said P×Q resolution image is displayed on the entire viewable area of said multi-scan type monitor with said P×Q resolution, and generating the high resolution synchronizing signal when said M×N resolution image is displayed on the entire viewable area of said multi-scan type monitor with said M×N resolution.

2. The computer system of claim 1, wherein said display switching means comprises a means for saving information corresponding to one of said first and said second images, and for restoring information corresponding to the other of said first and said second images when switching dynamically between said first and said second images.

3. The computer system of claim 1, wherein said means for generating comprises:

a first picture display control means for displaying said first image having M×N resolution and at least one window;

a second picture display control means for displaying said second image having P×Q resolution; and a signal output switching means, coupled to said first picture display control means and to said second picture display control means, for outputting a picture signal and said synchronizing signal to said multi-scan type monitor, and for selecting said picture signal from among said first and second picture display control means.

4. The computer system of claim 3, further comprising a non-display image updating means for updating the contents of an image memory not being displayed when image display is being performed by either said first or second picture display control means, and said image memory is included in a non-display image display control means which is either one of said first or second image display control means.

5. A computer system of claim 4, wherein one of the main operating system or minor operating system is run as a background process of one of the main operating system or minor operating system, and said image memory is updated by the non-display image updating means under control of the operating system running as the background process of one of the main operating system or minor operating system.

6. The computer system of claim 3, wherein said first and second picture display control means each comprise a memory that stores image information.

7. A computer system of claim 6, wherein the computer system further comprises a first update means for updating the memory included in the first picture display control means, and a second update means for updating the memory included in the second picture display control means.

8. A computer system of claim 7, wherein one of the first update means or second update means, updates the memory of one of the first picture display control means or second picture display control means, when the signal output switching means selects the picture signal from one of the first picture display control means or second picture display control means.

9. The computer system of claim 1, wherein said display switching means is responsive to a user operation.

10. The computer system of claim 1, further comprising a keyboard wherein said display switching means is responsive to a keyboard operation of a user.

11. The computer system of claim 1, wherein said display switching means comprises storage means for storing information that indicates which of said first and said second images is displayed.

12. The computer system of claim 1, wherein said display switching means comprises a memory that stores image information.

13. The computer system of claim 1, wherein said display switching means is responsive to a window designation means that designates one of windows being controlled by said main operating system means.

14. The computer system of claim 1, wherein said first image includes plural windows including said at least one window, and said main operating system means comprises:

means for designating one of said plural windows other than said at least one window; and means for displaying image data related to the designated window screen on the entire viewable area of the multi-scan type monitor with resolution M×N.

15. The computer system of claim 1, wherein the display switching means further comprises a means for saving video parameters required to switch between displaying said P×Q resolution and said M×N resolution.

16. A method for dynamically adjusting display resolution in a computer generated display, comprising:

providing a multi-scan type monitor having a viewable area and having at least high and low deflection frequencies which correspond to at least high and low resolution synchronizing signals, respectively;

controlling formation of a first image on the entire viewable area of the multi-scan type monitor using a main operating system, wherein the first image includes at least one window and has a resolution of M×N where M and N are integers;

associating a minor operating system to said window and executing the minor operating system as a subordinate process of the main operating system to control formation of a second image, said second image corresponding to the image data in the window of the first image and having a resolution of P×Q, where P and Q are integers, P is less than M, and Q is less than N; and switching display on the viewable area of the multi-scan type monitor between the first image and the second image, comprising generating the low resolution synchronizing signal applied to the monitor when the P×Q resolution image is displayed on the entire viewable screen of the multi-scan type monitor with the P×Q resolution and generating the high resolution synchronizing signal applied to the multi-scan type monitor when the M×N resolution image is displayed on the entire viewable area of the monitor with the M×N resolution.

17. The method of claim 16, comprising:

saving information corresponding to one of said first and second images and restoring information corresponding to the other of said first and second images when switching dynamically between the first and second images.

18. The method of claim 16, comprising:

selecting either said first image with said M×N resolution and having at least one window, or said second image having said P×Q resolution for display on the entire viewable area on said monitor, and outputting the selected image and its respective synchronized signal to said multi-scan type monitor for display of the selected image.

19. The method of claim 18, comprising:

using a keyboard to control selection of which images are to be displayed by the multi-scan type monitor.

20. The method of claim 16, comprising:

processing contents of an image memory storing the one of the first image or the second image not being displayed to update the non-displayed image when image display is being performed for the other of the first image or the second image.

21. The method of claim 20, comprising:

running one of the main operating system or minor operating system as a background process of one of the main operating system or minor operating system, wherein the operating system running as the background process updates the image memory.

22. The method of claim 16, comprising:

storing information indicating which of the first and second images is displayed.

23. The method of claim 16, comprising:

designating one of the windows being controlled by the main operating system to control selection of which image to display on the multi-scan type monitor.

24. The method of claim 23, comprising:

displaying the image related to the designated window on the entire viewable area of the multi-scan type monitor with the resolution of M×X.

25. The method of claim 16 comprising:

storing image information for the first image and second image.

26. The method of claim 25, comprising:

updating the image information for the first image and the second image.

27. The method of claim 26, comprising:

updating the image information for one of the first image or second image, when selecting one of the first image or the second image.

* * * * *